Nov. 14, 1944. J. C. PETERS ET AL 2,362,661
TELEMETRIC SYSTEM
Filed Feb. 19, 1942 3 Sheets-Sheet 1
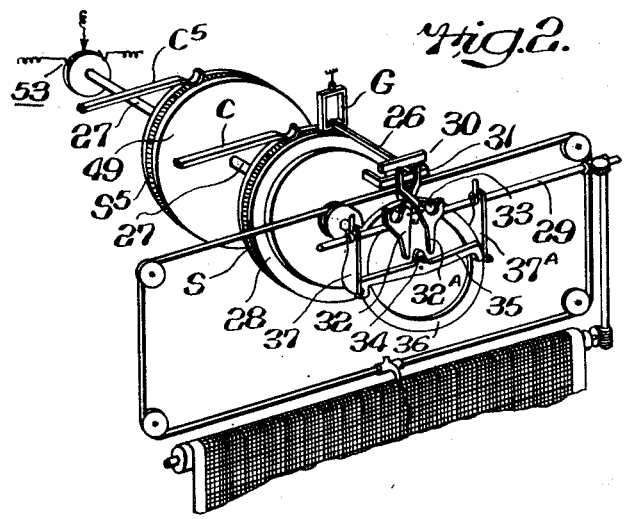
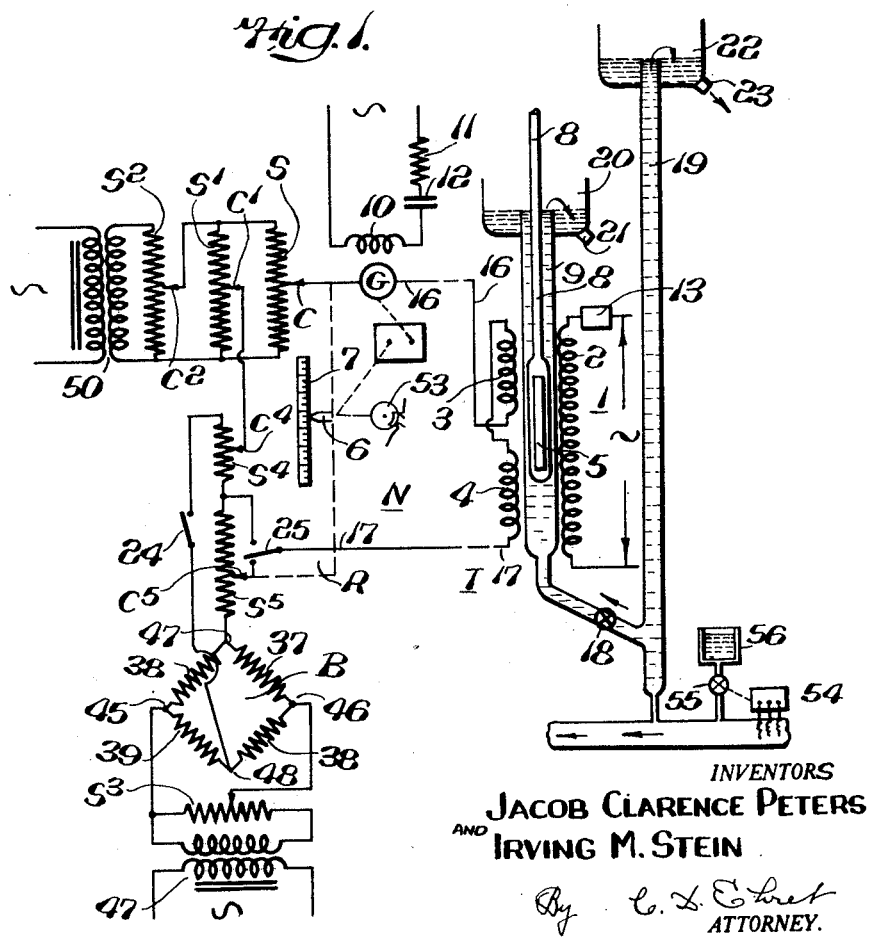
INVENTORS
JACOB CLARENCE PETERS
AND IRVING M. STEIN
ATTORNEY.

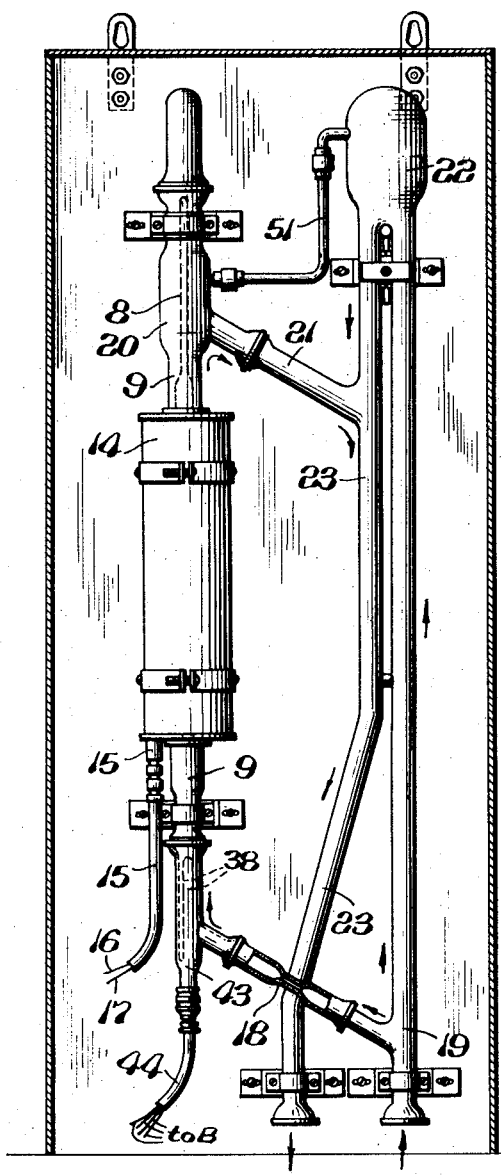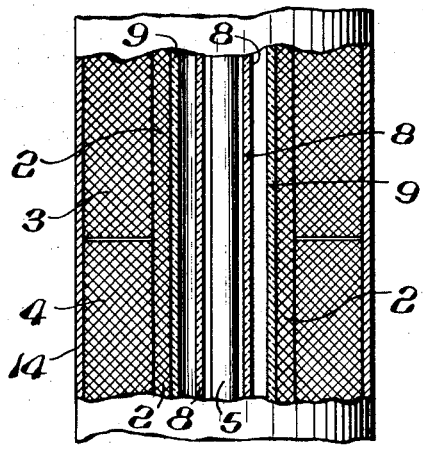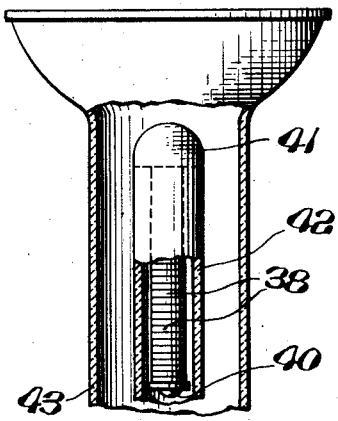

Nov. 14, 1944. J. C. PETERS ET AL 2,362,661
TELEMETRIC SYSTEM
Filed Feb. 19, 1942 3 Sheets-Sheet 3
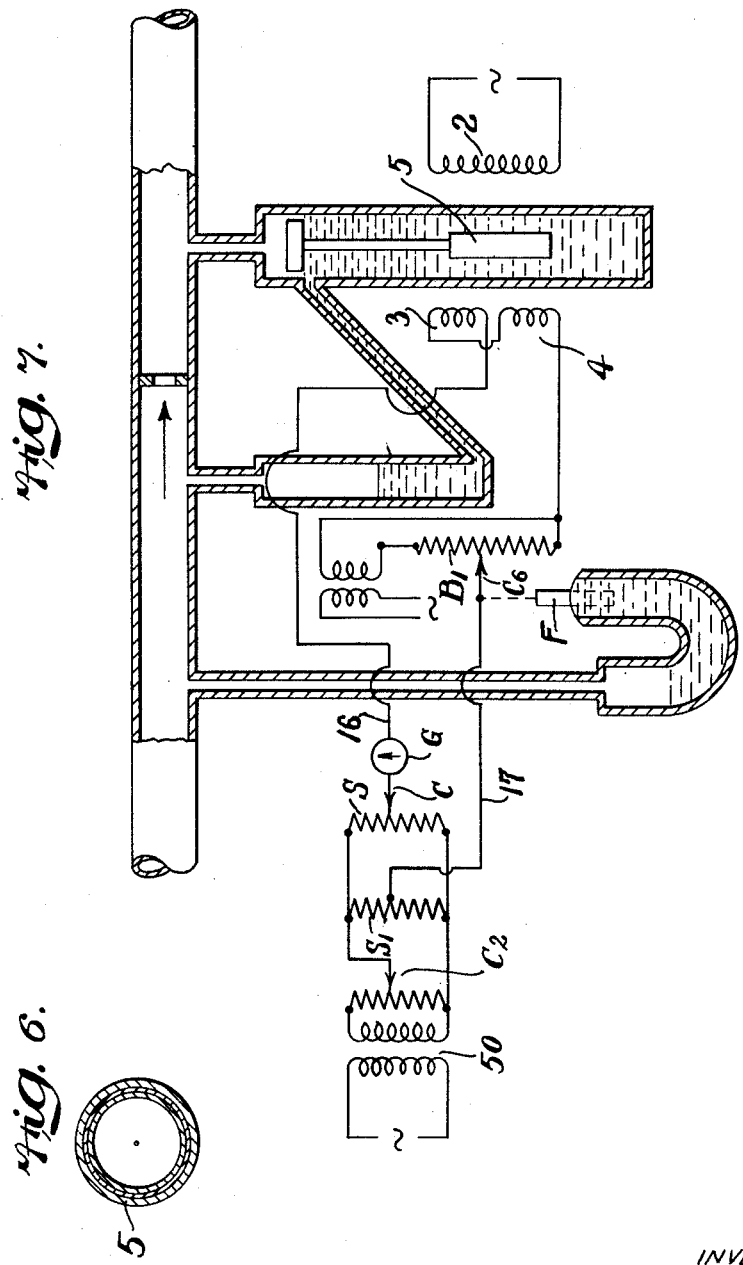
INVENTORS
JACOB CLARENCE PETERS
AND IRVING M. STEIN
C. L. Ehret
ATTORNEY Patented Nov. 14, 1944

2,362,661

UNITED STATES PATENT OFFICE 2,362,661

TELEMETRIC SYSTEM

Jacob Clarence Peters, Jenkintown, and Irving M. Stein, Philadelphia, Pa., assignors to Leeds and Northrup Company, Philadelphia, Pa., a corporation of Pennsylvania Application February 19, 1942, Serial No. 431,502

5 Claims. (Cl. 73—33)

Our invention relates to electrical systems of the type in which the position of a core or armature member controlling the reluctance of the magnetic circuit of windings or coils is varied in accordance with changes in magnitude of a condition, for example the specific gravity of a liquid, to affect a measuring device or network utilized to indicate, record, or control the magnitude of the condition.

In accordance with our invention, secondary windings of a transformer are connected in series opposition to produce an electro-motive-force which is of null or zero magnitude when a core or equivalent member movable in response to changes in magnitude of a condition is in predetermined position with respect to the windings, and which is of polarity and magnitude, for other positions of said member, corresponding respectively with the sense and extent of displacement of the member from aforesaid predetermined position; more particularly, flow of current in said coils is reduced to zero or null magnitude for each position of said core so that there is no tendency for it to assume an improper position because of its attraction or repulsion by magnetic fields of the coils, a feature of particular significance when the core is positioned by a hydrometer float or other sensitive and delicate condition-responsive device.

Our invention further resides in the features of structure, combination and arrangement hereinafter described and claimed.

For an understanding of our invention, reference is made to the accompanying drawings, in which:

Fig. 1 schematically illustrates a telemetric system for measuring specific gravity of a liquid;

Fig. 2, in perspective, illustrates significant elements of a mechanical relay which may be used in the system of Fig. 1;

Fig. 3 illustrates components of the transmitter comprised in the system of Fig. 1;

Fig. 4 is a detail view, on enlarged scale, disclosing the internal construction of the transmitter, Figs. 1 and 3;

Fig. 5 is a detail view, on enlarged scale, showing the location and construction of a temperature-responsive element of Figs. 1 and 3.

Fig. 6 is a cross-sectional view, on enlarged scale, of core structure shown in Figs. 1 and 5.

Fig. 7 schematically illustrates a telemetric system for measuring flow of fluid.

Referring to Fig. 1, illustrative of the application of our invention to a system for measuring specific gravity, the transmitter T, including transformer 1 comprising primary winding 2, secondary windings 3, 4 and the movable preferably magnetizable core 5, may be disposed more or less remote from the receiver R at which is located the galvanometer G, or equivalent, and slidewire S whose contact C is adjusted relative thereto to effect balance, indicated by null deflection of galvanometer G, of the network N comprising slidewire S, the secondary coils 3, 4 and other circuit components hereinafter mentioned. At balance of network N, the specific gravity may be read from scale 7 whose pointer 6 is adjusted in unison with slidewire contact C.

The contact $C_1$ of voltage-dividing resistance $S_1$, is manually set, for example, upon installation of the system, to that position for which the scale 7 indicates, at balance of the network, the specific gravity of liquid in which is disposed the hydrometer float 8 in whose bulb the transformer core element 5 is disposed.

The secondary windings 3, 4 of transformer 1 are connected in series opposition in network N so that when the core 5 is disposed symmetrically with respect to these windings, the voltages induced therein by flow of current through the primary winding 2 of the transformer are equal in magnitude and opposite in phase or polarity; consequently the resultant voltage of the two secondary windings is of zero magnitude. Assuming contacts C and $C_1$ of resistances S and $S_1$ are then in such position there is no difference of potential between said contacts, no current flows through the movable coil of galvanometer G.

Preferably the system is so designed that at balance under this circumstance, normal or desired specific gravity, the core is symmetrically disposed with respect to windings 3 and 4, the contacts C and $C_1$ are in mid-position electrically along resistances S and $S_1$, and index 6 is substantially midway of scale 7. So long as the range of movement of core 5 is such that its either end does not too closely approach an end of either of the coils 3, 4, a substantially linear relation exists between the position of the core and the algebraic sum of the electro-motive forces induced in the secondary windings 3, 4.

Assuming the specific gravity of the liquid rises above or falls below normal or desired value, the hydrometer float 8 moves the core 5 accordingly, and in consequence the voltages induced in the secondary windings 3, 4 are unequal; under the circumstance the core 5 is of magnetic material, an increase in specific gravity of the liquid causes the voltage induced in coil 3 to be larger than that concurrently induced in coil 4; conversely upon decrease below normal or desired magnitude of the specific gravity, the voltage induced in coil 4 is larger than that concurrently induced in winding 3. Consequently when the specific gravity rises above or falls below normal there is, until balance is restored, flow of current through the movable coil of the galvanometer G; the magnitude of the current depends upon the extent of movement of the core from the position for which network N previously was balanced; the phase of the current with respect to current flowing in the field winding 10 of the galvanometer depends upon the sense of displacement of the core 5 with reference to its aforesaid position for which network N previously was balanced.

For each position of the core 5, the measuring network is rebalanced by manual or automatic readjustment of contact C to that position for which the galvanometer deflection is again zero. Therefore for all positions of the core member 5, including even those positions for which the core is not symmetrical with respect to windings 3 and 4, no current flows through those coils when the network is in balance, notwithstanding that for such unsymmetrical positions of the core the difference between the voltages induced in windings 3 and 4 is not zero. For all positions of core 5, when the network N is in balance there is no current flowing through either of the secondary windings 3, 4 and therefore there is not produced by either of them a magnetic field tending to restrain core 5 in a position other than one accurately corresponding with the specific gravity of the liquid or magnitude of another condition under measurement. This freedom of member 5 to assume its correct position, truly representative of the specific gravity, is of course important not only when our system is used for measurement of specific gravity but also for measurement of any other condition, such as pressure, rate of flow, temperature, and the like, and particularly when the condition-responsive element is incapable of producing appreciable force for small changes in magnitude of the condition.

The field winding 10 of the galvanometer, the primary winding 2 of the transformer 1, and the resistances S, S1 of network N should be supplied with current from the same source, or at least from sources producing voltages of proper fixed phase relation; in the particular arrangement shown in Fig. 1, current is supplied to field winding 10 through a phase shifting network comprising the resistance 11 and condenser 12 respectively; similarly in the circuit of the transformer 1 is included a phase-determining network 13 of any suitable known characteristic. Accordingly the relation to each other of the phases determined respectively by 13 and 11, 12 is fixed and such that at balance of network N there is zero torque, and therefore no deflection of galvanometer G.

In the arrangement shown in Fig. 1, the range of the measuring system may be varied by adjustment of contact C2 along the slidewire S2 so to impress across slidewires S, S1 any desired percentage of the total available voltage, such as for example, the maximum secondary voltage of transformer 50. By manual adjustment of C2, the scale 7 for indicating core position, specific gravity in the particular system described, may therefore be expanded or contracted as desired to accommodate a desired range of measurement; alternatively, for a predesigned scale 7 the setting of the contact C2 may be varied to compensate for unavoidable departure from standard cross-section of the particular hydrometer float.

Referring to Figs. 3 and 4, the chamber 9 in which the hydrometer float 8 is disposed is a tube of glass or similar material about which is wound the primary winding 2 of transformer 1. The secondary windings 3 and 4 are disposed end to end over axially displaced portions of the primary winding. For protection, the transformer windings are encased within the housing 14 from which extends the cable 15 comprising conductors 16 and 17 (Fig. 3). Regardless of whether they are wound in the same or different directions, the connection between the secondary coils 3 and 4 is always such that the voltages induced therein are in series opposition as applied to the conductors 16, 17 extending from the transmitter to the receiving station.

The lower or inlet end of the float chamber 9 is connected, preferably through constriction such as 18, to the tube 19 through which the sample stream of the liquid flows. The liquid flows in the side stream upwardly through the float chamber 9, with a minimum of turbulence and without pockets in which gas may collect, at rate high enough that the side stream at all times has characteristics the same as those of the sample stream. It flows out of the upper end of the tube 9 into the overflow chamber 20, preferably closed to atmosphere, Fig. 3, whence it is returned to the sample main stream through the downwardly inclined connection 21. The sample stream flows from the upper end of the tube 19 of the device into the overflow chamber 22, preferably closed to atmosphere, Fig. 3, and in flowing downwardly through tube 23 rejoins the side stream diverted for measuring purposes through the float chamber 9.

As shown in Fig. 3, the two closed chambers 20, 22 are connected above the levels of liquid therein by the air or gas pressure-equalizing connection 51 so that the difference in level of the upper ends of tubes 9 and 19 determines the rate of flow of the side stream.

In the preferred hydrometer float construction shown, the usual shot or mercury loading is replaced wholly or in part by several, e. g. three, thin co-axial cylinders (Fig. 6) of transformer iron to form the core member 5; these cylinders extend end to end longitudinally of one another preferably without engaging. However, the weight of the core 5 may, when desirable, be supplemented by further material to procure a predetermined total loading.

In the system as thus far described, the conductor 17 is assumed to be connected at the receiving station directly to contact C1 of slidewire S1 with omission of the temperature-compensating network B hereinafter described; even when the system includes, as in Fig. 1, such temperature-compensating network, the conductor 17 is effectively directly connected to contact C1 insofar as operation of the system is concerned when the switch 24 is open.

The adjustment of contact C in rebalancing network N may be effected manually from time to time and the specific gravity then read from the scale 7; preferably however, the rebalancing adjustments are effected automatically, as by apparatus of the type shown in Fig. 2, and a continuous record made of the variations in specific gravity of the stream continuously flowing through the float chamber 9.

The mechanical relay mechanism, Fig. 2, preferably is of the type generically exemplified by such as disclosed and claimed in United States Letters Patent No. 1,935,732 to Squibb. In brief description of its mode of operation, when the pointer 26, attached to the movable element of galvanometer G, is deflected in one direction or the other from its neutral position, shaft 27, on which is mounted slidewire disk 28, is rotated through an angle substantially proportional to the extent of the deflection and in a direction corresponding with the sense of the deflection. In each revolution of continuously rotating shaft 29, the pointer 26 is clamped between the bars 30 and 31 at least one of which is movable; subsequently in each cycle and while the pointer is clamped the feelers 32, 32A are released for movement toward one another by their biasing spring 33. If the pointer 26 is clamped while away from its neutral position, the lower end of one or the other of the feelers 32, 32A engages pin 34 to rock the driving clutch member 35, then out of contact with the driven clutch member 36, through an angle corresponding with the galvanometer deflection. Subsequently in each cycle and while the clutch members 35, 36 are in engagement with each other, one or the other of the restoring cams 37, 37A on shaft 29 engages the driving clutch member 35 and returns it to its horizontal or neutral position. Shaft 27, attached to the driven clutch member 36, is therefore moved through an angle of magnitude corresponding with the extent of displacement of the pointer from neutral and in a direction corresponding with the sense of that displacement.

The aforesaid sequence of operations repeated, if necessary, in subsequent cycles of the mechanism, effects step-by-step adjustment of contact C until the network is rebalanced at the then existing position of core 5. The adjustment of the slidewire S with respect to its contact C is always in sense proper to restore balance of network N and at a rate substantially proportional to the unbalance.

A feature of the system as thus far described is that only two conductors, 16 and 17, are necessary between the coils 3 and 4 of the transmitter T and the receiving station. Since conductors 16 and 17 are not traversed by current when the network N is balanced, their impedances have no bearing upon the accuracy of the measurements, and they may be of any desired length, however great, without effect upon the calibration of the slidewire S and its scale; moreover, variation of their resistances with temperature introduces no error into the measurements. The resistance of conductors 16, 17 is of significance only insofar as it affects the sensitivity of galvanometer G.

For direct reading of specific gravity with correction for changes of temperature of the liquid, there may be added the network B, a Wheatstone bridge having in suitable of its arms the coils 38, 38 of nickel or other material having substantial temperature co-efficient of resistance, and in other arms coils 37, 38 of manganin, or other conductor having negligible or zero temperature co-efficient of resistance. The coils 38, 38, are so located that their temperature is the same or closely approximates that of the liquid in the float chamber 9; for example they may be located in the overflow stream in passage 21, or, as shown in Figs. 3 and 5, they may be located beyond the constriction 18 in the path of the fluid entering, or in the lower part of, the float chamber 9.

In construction, the resistance-thermometer coil assembly may be similar to those disclosed in United States Letters Patent 2,102,030 to Quereau; as shown in Fig. 5 hereof, the coil 38 may be wound upon a form 40 of metal intimately thermally related at least to the tip 41 of the thermometer housing 42. The leads from the coils 38, 38 may be imbedded in or extend through the lower end of the member 43, an extension forming the lower end of float chamber 9, and in either case their effective continuations are comprised in the cable 44 for connection of the coils 38, 38 in bridge network B.

One pair of conjugate points 45, 46 of this bridge are connected to a suitable supply of voltage, for example, to a voltage dividing resistance S3 included in the secondary circuit of transformer 47 energized either from the same source of current as transformer 1, or from another source having proper phase relation with respect thereto. Between the other pair of conjugate points 47, 48 of the bridge are connected in series, when switch 24 is closed, the two resistances S4, S5, the latter mounted upon disk 49, Fig. 2, for adjustment with respect to its contact C5 concurrently with adjustment of slidewire S of the measuring network.

When switch 25 is in its upper position, Fig. 1, the temperature compensation introduced into the potentiometer circuit or network N is uniform or fixed and therefore only partial for most of the range of measurements whereas when switch 25 is in its lowermost position the amount of compensation automatically varies not only with temperature but also with the specific gravity of the liquid and so affords substantially complete correction for all values within the range of measurements. In practice, slidewire contact C4 is adjusted manually to provide the proper relationships between the compensations required near the high and low limits of scale 7; slidewire S3 is then manually adjusted to obtain the correct or desired compensation for that magnitude of the specific gravity, or other controlled condition, which is usual or normal for the particular system or its operating conditions at a particular time.

In addition to or instead of controlling the position of a pointer or of a stylus with respect to a chart, the network N and the relay of Fig. 2, or its equivalent, may be utilized to control the application of an agent affecting the magnitude of the condition under measurement; for example, the addition of reagent to the stream flowing through tubes 19 and 23 may be automatically controlled to maintain the specific gravity constant at desired magnitude by providing a reversing switch 53, the relative positions of whose contacts depends upon the angular position of shaft 27, Fig. 2, to control the reversible motor 54 mechanically coupled to valve 55 between the tank 56 of reagent and the pipe 19.

In substitution for network B or effectively in series therewith in conductor 17, there may be provided a source of voltage varying as a function of pressure, for example a potentiometer slidewire B' adjusted relative to its contact C6, Fig. 7, in response to pressure of a gas whose rate of flow determines the position of core 5 which for this purpose may be positioned by a float such as F of Fig. 5 of Letters Patent 2,045,970.

What we claim is:

1. A system comprising a source of current a transformer having a primary winding, connected to said source, and secondary windings in series opposition and core structure movable with respect to said windings, means responsive to the changes in magnitude of a condition for effecting movement of said core structure differentially to vary the magnitudes of electro-motive-forces induced in said secondary windings, a galvanometer, and a balanceable network including all in series with each other said secondary windings, said galvanometer and a source of voltage adjustable to balance the difference between aforesaid electro-motive-forces and to reduce flow of current in both of said windings to null or negligible magnitude in avoidance of effect of magnetic fields upon the position of said core.

2. A system comprising a source of current, a transformer having a primary winding, connected to said source, and secondary windings in series opposition and core structure movable with respect thereto, means for positioning said core in accordance with the magnitude of a condition to predetermine the difference between the magnitudes of electro-motive-forces induced in said secondary windings, a galvanometer, and a balanceable network including all in series with each other said secondary windings, said galvanometer and a source of voltage adjustable to balance the difference between aforesaid induced electro-motive-forces and to reduce flow of current in both of said windings to null or negligible magnitude in avoidance of magnetic fields affecting the position of said core.

3. A system comprising a source of current, a transformer having a primary winding, connected to said source, and secondary windings in series opposition and core structure movable with respect thereto, means responsive to changes in magnitude of a condition for positioning said core structure in determination of the magntiude and phase of the resultant of the electro-motive-forces induced in said secondary windings, a galvanometer, a network including said secondary windings, means for supplying said network and the primary of said transformer with currents whose phase relation is predetermined, said secondary windings and said galvanometer connected in series with each other, and with means for effecting in said network for each position of said core structure an electro-motive-force of phase and magnitude which balances aforesaid resultant of the induced electro-motive-forces and reduces flow of current in said secondary windings to null or negligible magnitude in avoidance of effect of their magnetic fields upon the position of said core.

4. In a system for determining the specific gravity of a liquid, a source of alternating current, a transformer having a primary winding, connected to said source, and secondary windings in series opposition and a core movable with respect thereto in response to changes in the specific gravity of the liquid to determine the magnitudes of the electro-motive-forces induced in said windings, means including a source of voltage for producing an alternating electro-motive-force of magnitude representing the temperature of said liquid, a balanceable network including, all in series with each other, said last-named source of voltage and said secondary windings, a source of alternating voltage in said network in series with aforesaid windings and source of voltage, means adjustable to vary said last-named voltage to balance the resultant of all aforesaid electro-motive-forces and to reduce flow of current through said secondary windings to null or negligible magnitude in avoidance of magnetic fields affecting the position of said core, and means for indicating balance of said network, the position of said adjustable means indicating the specifice gravity of said liquid.

5. A telemetric system, for evaluating at a receiver the changes in magnitude of a condition occurring at a transmitter, comprising a source of alternating current, a transformer at the transmitter having a primary winding, connected to said source, and secondary windings in series opposition and a core movable with respect to said windings, means responsive to changes in magnitude of a condition for effecting movement of said core differentially to vary the electro-motive-forces induced in said secondary windings, at the receiver a source of alternating voltage variable to balance the resultant of said electro-motive-forces and to reduce flow of current through said secondary windings to null or negligible magnitude to avoid magnetic fields affecting the position of said core, two conductors only extending between the transmitter and receiver connecting in a circuit in series with each other said last-named source and said secondary windings, a galvanometer in series in said circuit, and means controlled by said galvanometer for evaluating the magnitudes of said condition.

JACOB CLARENCE PETERS.
      IRVING M. STEIN.